(12) United States Patent
Lemenager et al.

(10) Patent No.: US 7,477,160 B2
(45) Date of Patent: Jan. 13, 2009

(54) WIRELESS COMMUNICATIONS ASSOCIATED WITH A WELLBORE

(75) Inventors: Erwann Lemenager, Paris (FR); Herve Ohmer, Houston, TX (US); Klaus B. Huber, Sugar Land, TX (US); Randolph J. Sheffield, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 217 days.

(21) Appl. No.: 11/163,502

(22) Filed: Oct. 20, 2005

(65) Prior Publication Data

US 2007/0024464 A1    Feb. 1, 2007

Related U.S. Application Data

(63) Continuation-in-part of application No. 11/161,342, filed on Jul. 29, 2005, now Pat. No. 7,347,271.

(60) Provisional application No. 60/522,673, filed on Oct. 27, 2004.

(51) Int. Cl.
*G01V 3/00* (2006.01)

(52) U.S. Cl. .............. 340/853.1; 340/853.3; 340/854.6; 166/355; 166/336; 166/366; 324/338

(58) Field of Classification Search .............. 340/853.1, 340/853.3, 854.6; 166/335, 336, 366; 324/338
See application file for complete search history.

(56) References Cited

U.S. PATENT DOCUMENTS

| | | | |
|---|---|---|---|
| 3,967,201 A | 6/1976 | Rorden | |
| 4,755,944 A | 7/1988 | Glass | |
| 5,187,440 A | 2/1993 | Vail, III | |
| 5,576,703 A | 11/1996 | MacLeod et al. | |
| 5,721,538 A | 2/1998 | Tubel | |
| 5,941,307 A * | 8/1999 | Tubel | 166/313 |
| 5,959,547 A * | 9/1999 | Tubel et al. | 340/853.2 |
| 6,114,972 A | 9/2000 | Smith | |
| 6,150,954 A | 11/2000 | Smith | |
| 6,177,882 B1 | 1/2001 | Ringgenberg | |
| 6,188,221 B1 | 2/2001 | Van de Kop et al. | |
| 6,218,959 B1 | 4/2001 | Smith | |
| 6,253,848 B1 | 7/2001 | Reimers et al. | |
| 6,657,597 B2 | 12/2003 | Rodney et al. | |
| 6,696,839 B2 | 2/2004 | Ellingsrud et al. | |
| 6,715,551 B2 | 4/2004 | Curtis et al. | |
| 6,717,411 B2 | 4/2004 | Ellingsrud et al. | |
| 6,739,165 B1 | 5/2004 | Strack | |
| 6,781,520 B1 | 8/2004 | Smith et al. | |

(Continued)

FOREIGN PATENT DOCUMENTS

EP    0 932 054 A2    7/1999

(Continued)

*Primary Examiner*—Jeff Hofsass
*Assistant Examiner*—Sisay Yacob
(74) *Attorney, Agent, or Firm*—Daryl R. Wright; Trop, Pruner & Hu, P.C.; James L. Kurka (57) ABSTRACT

A subsea communication system includes addressable nodes in a wellbore and addressable nodes on a floor, where the nodes in the wellbore and on the floor are able to communicate wirelessly with each other, such as through a formation.

19 Claims, 7 Drawing Sheets

U.S. PATENT DOCUMENTS

| | | |
|---|---|---|
| 6,885,942 B2 | 4/2005 | Shray et al. |
| 2003/0098799 A1 | 5/2003 | Zimmerman |
| 2005/0017723 A1 | 1/2005 | Entov et al. |

FOREIGN PATENT DOCUMENTS

| | | |
|---|---|---|
| EP | 0930518 A2 | 7/1999 |
| RU | 2124455 | 1/1999 |
| SU | 1681800 | 10/1991 |
| WO | 2001/84291 A1 | 11/2001 |
| WO | WO-2003025803 A1 | 3/2003 |
| WO | 2004/003329 A2 | 1/2004 |
| WO | 2004/003329 A3 | 1/2004 |

* cited by examiner

WIRELESS COMMUNICATIONS ASSOCIATED WITH A WELLBORE

CROSS REFERENCE TO RELATED APPLICATIONS

This is a continuation-in-part of U.S. Ser. No. 11/161,342, filed Jul. 29, 2005, which claims the benefit under 35 U.S.C. § 119(e) of U.S. Provisional Application No. 60/522,673 filed Oct. 27, 2004, both hereby incorporated by reference.

BACKGROUND

The invention relates generally to wireless communications in wellbores. As technology has improved, various types of sensors and control devices have been placed in hydrocarbon wells, including subsea wells. Examples of sensors include pressure sensors, temperature sensors, and other types of sensors. Additionally, sensors and control devices on the sea floor, such as sand detectors, production sensors and corrosion monitors are also used to gather data. Information measured by such sensors is communicated to well surface equipment over communications links. Control devices can also be controlled from well surface equipment over a communications link to control predetermined tasks. Examples of control devices include flow control devices, pumps, choke valves, and so forth.

Exploring, drilling, and completing a well are generally relatively expensive. This expense is even higher for subsea wells due to complexities of installing and using equipment in the subsea environment. Running control lines, including electrical control lines, between downhole devices (such as sensor devices or control devices) and other equipment in the subsea environment can be complicated. Furthermore, due to the harsh subsea environment, electrical communications lines may be subject to damage, which would mean that expensive subsea repair operations may have to be performed.

SUMMARY

In general, methods and apparatus are provided to enable wireless communications between or among devices in an oilfield and in land or subsea wellbores.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

As used here, the terms "up" and "down"; "upper" and "lower"; "upwardly" and "downwardly"; "upstream" and "downstream"; "above" and "below" and other like terms indicating relative positions above or below a given point or element are used in this description to more clearly described some embodiments of the invention. However, when applied to equipment and methods for use in wells that are deviated or horizontal, such terms may refer to a left to right, right to left, or other relationship as appropriate.

Although the Figures illustrate the use of the present invention in a subsea environment, it is understood that the invention may also be used in land wells and fields.

Figure 1:
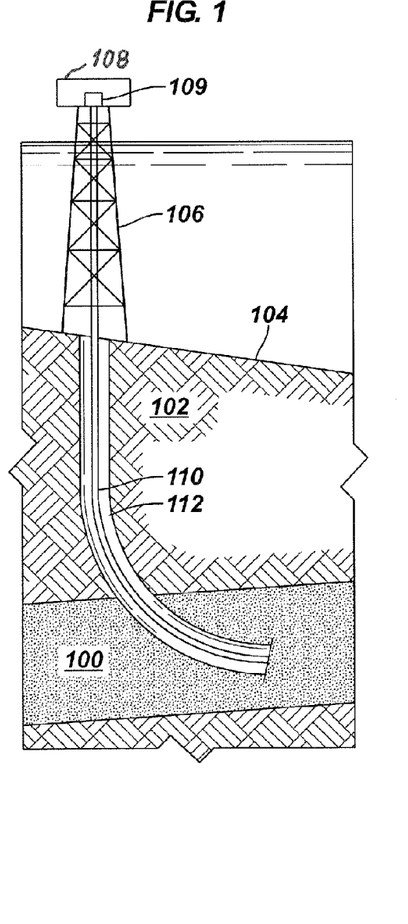
FIGS. 1 and 2 illustrate example subsea environments incorporating some embodiments of the invention.

FIG. 1 shows a first arrangement of a subsea environment that includes a reservoir 100 (such as a hydrocarbon reservoir) underneath an earth formation 102. The formation 102 defines a sea floor 104 on which a production platform 106 is located. The subsea environment of FIG. 1 is an example of a shallow water production environment that enables the production platform to be mounted on the sea floor 104. A production string 110 extends from a wellhead 108 through sea water and the formation 102 to the reservoir 100. A subsea wellbore 112 extends from the sea floor 104 through the formation 102 to the reservoir 100. The production string 110 extends through the subsea wellbore 112. As further shown in FIG. 3, electrical devices are located on the sea floor 104 as well as in the subsea wellbore 112.

In accordance with some embodiments of the invention, wireless communications (e.g., by use of electromagnetic signals, acoustic signals, seismic signals, etc.) Can be performed between devices on the sea floor 104 and downhole devices in the subsea wellbore 112. In one embodiment, the devices on the sea floor 104 and in the subsea wellbore 112 are electrical devices. Also, wireless communications can be performed between the devices in the wellbore 112 and surface devices, such as a controller 109 located on the production platform 106. Additionally, wireless communications can occur between downhole devices inside the wellbore 112, or between devices on the sea floor 104.

Wireless signaling can be communicated through the formation through low-frequency electromagnetic signaling, which is subject to less attenuation in the formation. Another type of wireless signaling that can be communicated through the formation is seismic signaling.

The term "electrical device" refers to any device requiring electrical energy to operate. Such devices (or any other device) are capable of communicating wirelessly with other devices by use of the different wireless communication signals previously described. In one embodiment, each electrical device is connected to its own power supply (such as a battery or fuel cell or such as a direct power supply via seabed umbilicals). An electrical device includes either a sensor or a control device. A sensor refers to a device that is able to monitor an environmental condition, such a characteristic (e.g., temperature, pressure, etc.) In the subsea wellbore 112, a characteristic (e.g., resistivity, etc.) of the reservoir 100, or a characteristic (e.g., temperature, etc.) of the sea water. A control device is a device that is able to control operation of another component, such as a valve, packer, etc.

Figure 2:
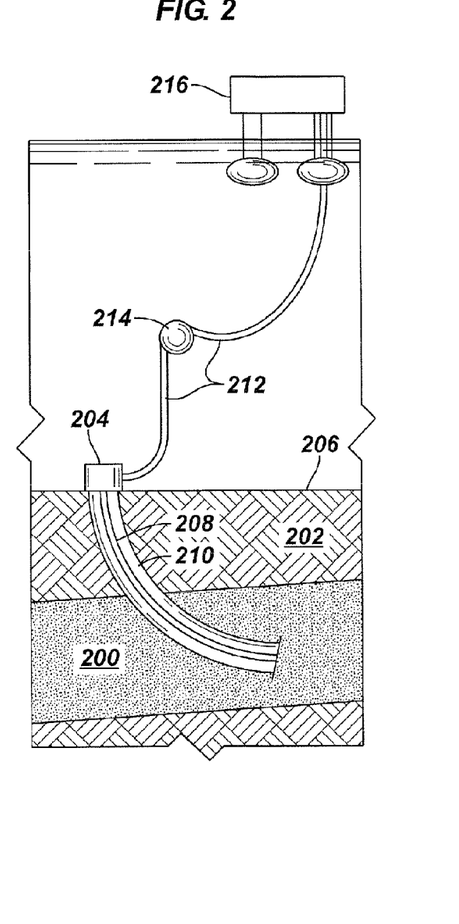

FIG. 2 illustrates another arrangement of a subsea environment that includes a reservoir 200 and an earth formation 202 above the reservoir 200. The FIG. 2 subsea environment is an example of a deep water subsea environment, in which the wellhead 204 is located at the sea floor 206. A production string 208 extends from the wellhead 204 into a subsea wellbore 210, with the production string 208 extending through the subsea wellbore 210 to the reservoir 200.

In one embodiment, the subsea wellhead 204 is coupled to a subsea conduit 212, which can be maintained in position in the sea water by a floating buoy 214. The conduit 212 extends upwardly to a floating production unit 216. As with the subsea environment of FIG. 1, devices, such as electrical devices, are located on the sea floor 206 as well as in the subsea wellbore 210. Also, electrical devices, such as a controller, are located on the floating production unit 216. Wireless communications can occur between the devices in the subsea wellbore 210 and devices on the sea floor 206, as well as with devices on the production unit 216. Also, wireless communications can occur between devices in the subsea wellbore 210, or between devices on the sea floor 206.

Figure 3:
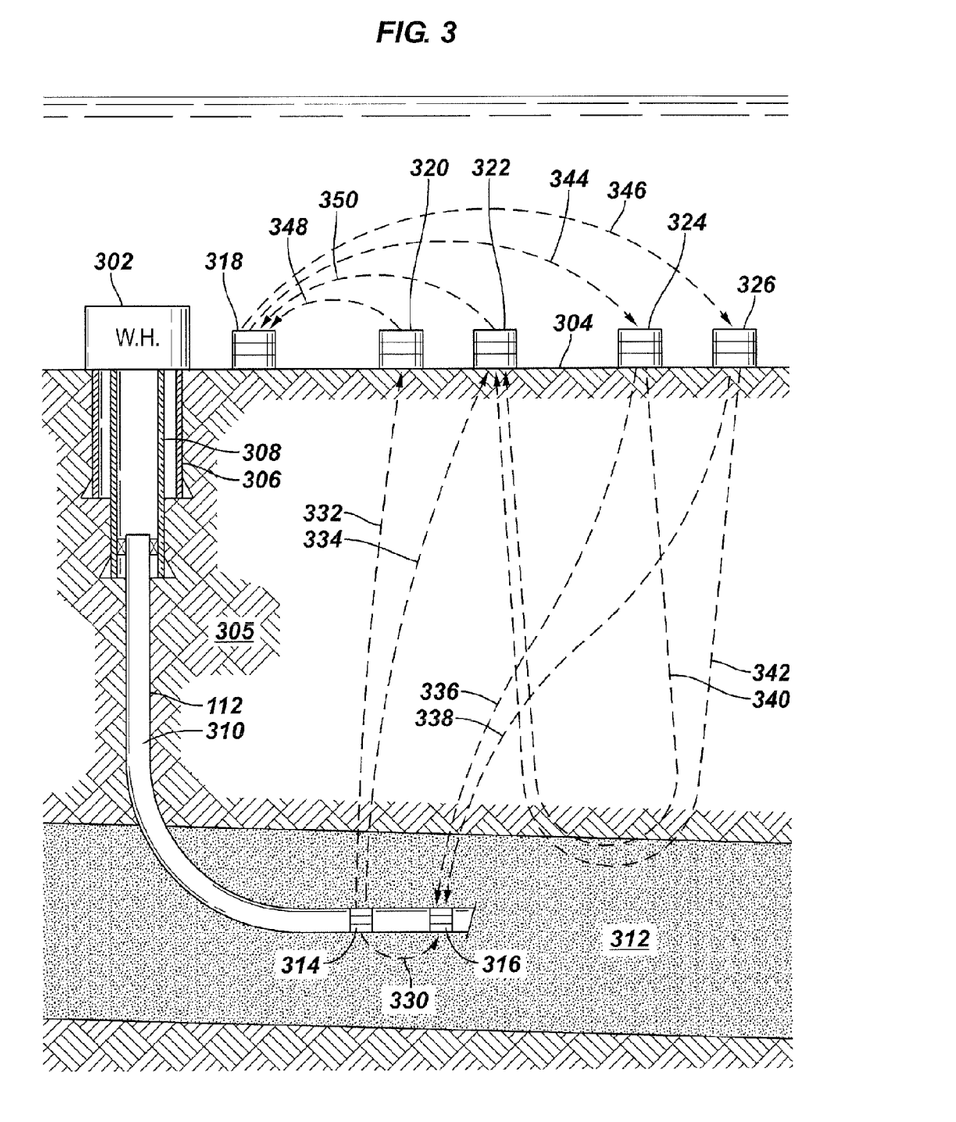
FIG. 3 illustrates wireless communication between or among subsea electrical devices and downhole electrical devices, according to an embodiment.

FIG. 3 illustrates example wireless communications between various devices, such as electrical devices. In FIG. 3, a wellhead 302 is located on sea floor 304. A subsea well is cased by casing sections 306 and 308. A production string 310 extends from a section of the subsea well into a reservoir 312. Electrical devices, such as sensors 314 and 316, are located in the production string 310 in the vicinity of the reservoir 312. Instead of being sensor devices, the electrical devices in the production string 310 can also be control devices, such as control devices for actuating valves, packers, perforating guns, and other downhole tools. Electrical devices can also be located elsewhere on the production string 310. In one embodiment, each electrical device 314, 316 includes either a transmitter or a receiver or both a transmitter and receiver ("transceiver").

FIG. 3 also depicts electrical devices 318, 320, 322, 324 and 326 located proximal the sea floor 304. Each of the electrical devices 318, 320, 322, 324, and 326 includes a transmitter or a receiver or a transceiver. An electrical device is "proximal" a sea floor if the electrical device is either on the sea floor or located a relatively short distance from the sea floor.

As depicted in FIG. 3, wireless communications 330 can occur between the production string electrical devices 314 and 316, in which a transmitter in the electrical device 314 transmits wireless signals (through the subsea wellbore and/or through the reservoir 312/formation 305) to a receiver in the electrical device 316. Also, the transmitter in the electrical device 314 can send (at 332, 334) wireless signals through a formation 305 to respective electrical devices 320 and 322. In one example implementation, the electrical device 314 is a sensor that is able to send measurement data through the formation 305 to respective receivers 320, 322. The receivers 320, 322 in turn communicate the received data (at 348, 350) to the electrical device 318. The electrical device 318 is connected by a communications link (optional) to sea surface equipment.

In the other direction, transmitters in the electrical devices 324 and 326 proximal the sea floor 304 can send (at 336, 338) wireless signals to the receiver in the electrical device 316 attached to the production string 310. For example, the electrical device 316 can be a control device that is actuated in response to commands carried in the wireless signals from the electrical devices 324, 326. The control device 316 can be instructed to perform predefined tasks.

Reservoir monitoring can also be performed from the sea floor 304. The electrical devices 324, 326 are able to transmit, at 340, 342 respectively, wireless signals through the formation 305 to the reservoir 312. The wireless signals at 340, 342 are reflected back from the reservoir 312 to a receiver in the electrical device 322. The modulation of the wireless signals by the reservoir 312 provides an indication of the characteristic of the reservoir 312. Thus, using the communications 340, 342 between the transmitters 324, 326 and the receiver 322, a subsea well operator can determine the content of the reservoir (whether the reservoir is filled with hydrocarbons or whether the reservoir is dry or contains other fluids such as water).

Wireless communications can also occur between electrical devices proximal the sea floor 304. For example, as depicted in FIG. 3, a transmitter in the electrical device 318 can transmit (at 344, 346) wireless signals, such as through sea water, to respective receivers in electrical devices 324 and 326. The wireless signals sent at 344, 346 can include commands to instruct the electrical devices 324, 326 to perform reservoir characteristic testing by sending wireless signals at 340, 342. Signals at 344 and 346 can also include commands for electrical devices 324 and 326 to send commands to instruct electrical devices 314 and 316 to perform a certain operation (i.e. Set a packer or open a valve).

Also, the electrical devices 320, 322 are able to send (at 348, 350) wireless signals to the electrical device 318. The wireless signals sent at 348, 350 can carry the measurement data received by the electrical devices 320, 322 from the downhole electrical device 314.

The wireless communications among various electrical devices depicted in FIG. 3 are exemplary. In further implementations, numerous other forms of wireless communications can be accomplished between or among different combinations of downhole devices, devices proximal the sea floor, and sea surface devices.

The various electrical devices (including electrical devices in the wellbore 112 and electrical devices proximal the sea floor) depicted in FIG. 3 are considered to be part of a network (or multiple networks). The electrical devices that are capable of communicating in the network(s) are also referred to as "network nodes." The network nodes in a wellbore are referred to as wellbore nodes, while the network nodes proximal the sea floor are referred to as seabed nodes. A "subsea node" refers to either a wellbore node or a seabed node. Also, there can be one or more network nodes at the sea surface (e.g., controller 109 in FIG. 1). Such a network node is referred to as a surface node. The various network nodes are capable of wirelessly communicating with each other in the network(s). Also, at least some of the network nodes are coupled to each other by cables (e.g., electrical cables, fiber optic cables, etc.) To enabled wired communications.

In one specific example, transmitters in each of the electrical devices 324, 326 may be able to produce controlled source electromagnetic (csem) sounding at low frequency (few tenths to few tens hertz) electromagnetic signaling, combined with a magnetotelluric technique to map the resistivities of the reservoir (and hence hydrocarbon layers—as well as other layers—in the reservoir). Magnetotelluric techniques measure the earth's impedance to naturally occurring electromagnetic waves for obtaining information about variances in conductivity (or resistivity) of the earth's subsurface.

Figure 4:
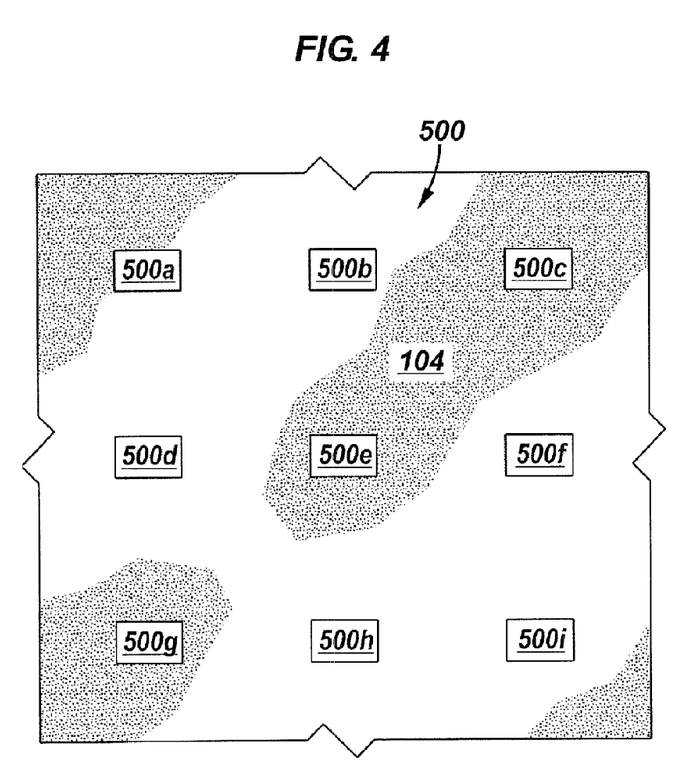
FIGS. 4 and 5 illustrate plan views of the network of devices that can be used in different phases of the wellbore life.

To enable this mapping and as shown in FIG. 4, a network 500 of electrical devices (network nodes) 500a-i can be deployed on the floor 104. Nodes 500a-i are as described in relation to devices 318, 320, 322, 324 and 326 above. With the use of a network 500 on the floor (instead of one, two, or even a few devices), an operator can obtain a broad map of the reservoir 312.

The electrical devices 324, 326 (500a-i) can be electric dipole devices that include a high power source, such as a power source capable of producing 100 volts and 1,000 amps, in one example implementation. For receiving wireless signals reflected from the reservoir 312, the electrical devices 320, 322 (500a-i) include sensors/receivers to perform reservoir mapping based on the signals reflected from the reservoir 312. The electromagnetic mapping provides a complement to seismic mapping at the seismic scale for fluid determination to help reduce dry-hole scenarios. The electromagnetic mapping described here can be performed during an exploration phase.

Figure 5:
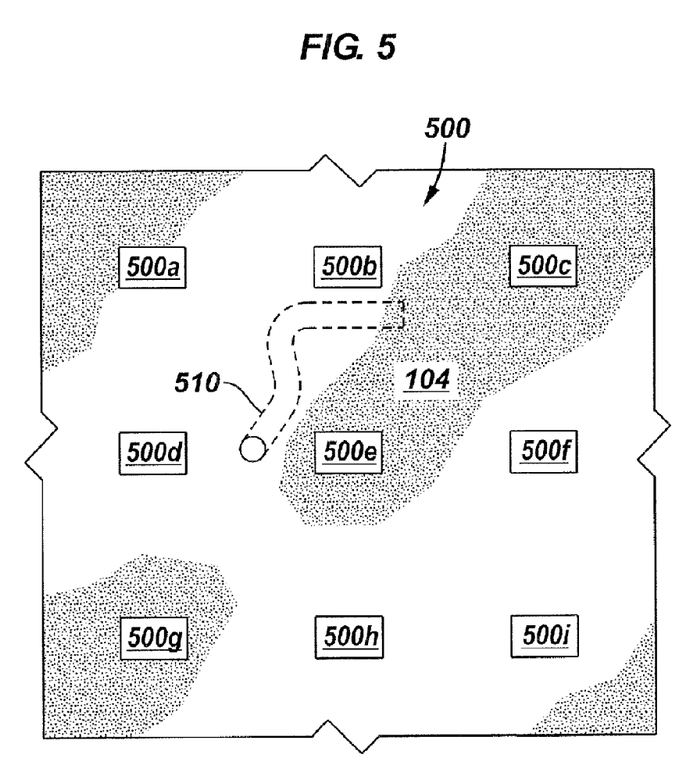
Figure 6:
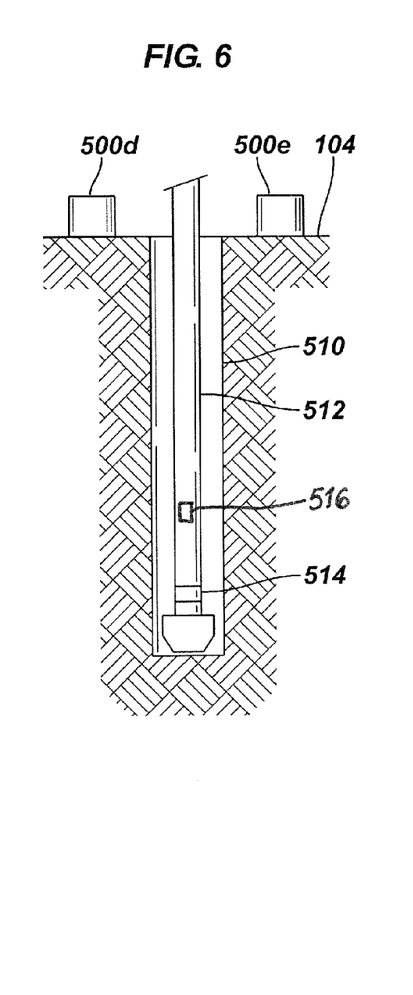
FIG. 6 illustrates the use of the network in the drilling phase of the wellbore life.

In a drilling phase and as shown in FIGS. 5 and 6, the same network 500 of sea floor receivers 320, 322 (500a-i) can be used to support drilling with electromagnetic telemetry. Drilling with electromagnetic telemetry provides feedback from the wellbore (shown in FIG. 5 as 510 in phantom lines) at all times, such as during mud circulating and non-circulating operations. As a result, a more secure well drilling environment can be achieved. In addition, the trajectory of drill string 512 in drilling wellbore 510 (see FIG. 6) can be more closely monitored and controlled. In this embodiment, drill string 512 carries the relevant receivers, transmitters, and/or transceivers 514 to enable communication with the nodes 500a-i. Formation damage can also be reduced as the fluids can be controlled for formation purposes only, not as a telemetry channel. The receivers 320, 322 (500a-i) can be coupled with acoustic transmitters/receivers to make the link through the sea water to other electrical devices on the sea floor or with electrical devices on the sea surface.

Alternatively, steering of the drill string 512 can be accomplished by using triangulation. The seabed nodes can periodically or continuously transmit wireless signals (e.g., clock signals) that are received by receivers in the drill string 512. Using triangulation (similar to global positioning system triangulation), a controller 516 in the drill string 512 can estimate the distance of the drill string to each seabed node. The estimation of distance can be based on signal attenuation (larger distance means more signal attenuation). Signal attenuation is also based on formation resistivity and signal frequency. Distance estimation can also be based on phase shifts of the signals (which can have multiple frequencies). Based on the estimated distances, the controller 516 in the drill string 512 can compute its position. This position can then be communicated to one or more of the seabed nodes.

Alternatively, instead of the seabed nodes transmitting wireless signals, one or more nodes of the drill string 512 can periodically or continuously transmit wireless signals. The transmitted signals as received by the seabed nodes can then be used to triangulate the position of the drill string 512. Based on the position of the drill string 512, the trajectory of the drill string 512 can be modified.

With a well-established grid or network 500 of electromagnetic transmitters/receivers already in place from the exploration and drilling phases, the same network 500 can be used in the completion and/or production phases of the well. With the use of the network 500 and its wireless communication, completion operations can be enabled and made more efficient. Telemetry to individual downhole devices permits installations without intervention and also allows a higher degree of selectivity in the installation process. For example, operations relating to setting packers, opening or closing valves, perforating, and so forth, can be controlled using electromagnetic telemetry in the network of transmitters and receivers. The transmitters and receivers used for completion operations can be the same transmitters and receivers previously established during the exploration and drilling phases.

Production management activities can also capitalize on the already established network of nodes 500a-i. With the established grid of in-well and sea floor transmitters and receivers, deep reservoir imaging and fluid movement monitoring can be accomplished. The benefit is the reduction, if not elimination, in the number of cables and control lines that may have to be provided for production purposes. For example, pressure gauges deep in the reservoir 312 can transmit to the nodes 500a-i without wires or cables. Fluid movement monitoring can be enabled with repeat electromagnetic sounding over time.

The use of the same network 500 of nodes 500a-i for all phases or more than one phase of field development (exploration, drilling, completion, production) is beneficial because it gives an operator the highest use of capital and operational resources. The network 500 may even be used in other phases of the well, such as abandonment and leak monitoring.

The source of electromagnetic energy that enables the network 500 may be portable so that it can be brought back to the field when necessary thereby not leaving a valuable resource idle. Moreover, different sources can also be used depending on the power required by the wireless operation(s) to be carried out.

Figure 7:
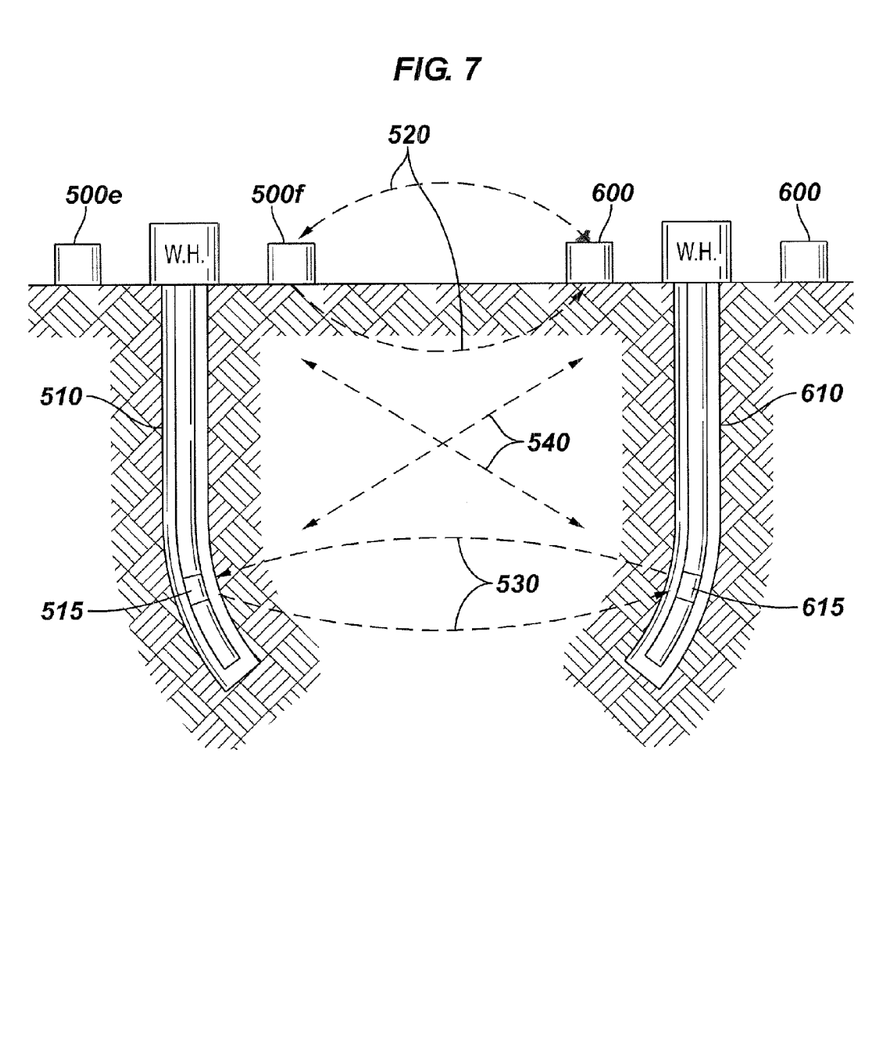
FIG. 7 illustrates wireless communication between two networks and wellbores.

In addition, as shown in FIG. 7, the network 500 of nodes may wirelessly communicate with another network 600 of nodes associated with another wellbore 610 or field. The first and second networks 500 and 600 may communicate with each other at 520. The downhole nodes 515 and 615 associated with each network 500 600 may communicated with each other at 530. Or, each network 500 and 600 may communicate with the other's downhole nodes 615, 515 at 540.

It is understood that a network may be associated with one or more wellbores. It is also understood that a network may be associated with one or more fields.

In an alternative embodiment, any of the network 500 nodes may be hard wired to each other.

In one embodiment, the network and/or the downhole nodes may include a wake-up feature that activates the network (to send the relevant signals) when particular events occur (downhole or elsewhere). The wake-up feature may also activate downhole nodes to perform certain functions on the occurrence of particular events.

According to some embodiments, each of the nodes depicted in FIGS. 3-7 are addressable network nodes, where each node is assigned a unique address. Thus, a command message can be sent to a specific one of any of the nodes by associating a specific address of that node with the command. Similarly, a message received from a transmitting node can be identified as belonging to the transmitting node based on the address contained in the message. As used here, the term "message" includes any one or more of the following: a command, data, diagnostic information, and so forth. A benefit of using addressable network nodes is that a message (sent over the wireless and/or wired one or more networks) can be targeted to a specific node such that other nodes do not have to process the content of the message. In some embodiments, any of the nodes of the one or more networks can communicate with any other node in the one or more networks. Alternatively, a master/slave network configuration can be defined for the one or more networks, in which slave nodes transmit messages to a master node, which in turn redirects the messages to another slave node that is the target of the transmission.

Also, according to some embodiments, any node depicted in FIGS. 3-7 is able to communicate with a surface device (such as controller 109 of FIG. 1 or some other surface device) through the sea water. The communication between a subsea node and the surface node can be accomplished by using wireless communications (such as acoustic or electromagnetic communications) or by an umbilical line (which can contain electrical conductors or fiber optic conductors, as examples). In some arrangements, the surface node (such as the controller 109 of FIG. 1) can be considered the master node in the one or more networks. However, subsea master nodes can also be implemented in some arrangements. A subsea master node can be located proximal the seabed or be located in the subsea wellbore.

Figure 8:
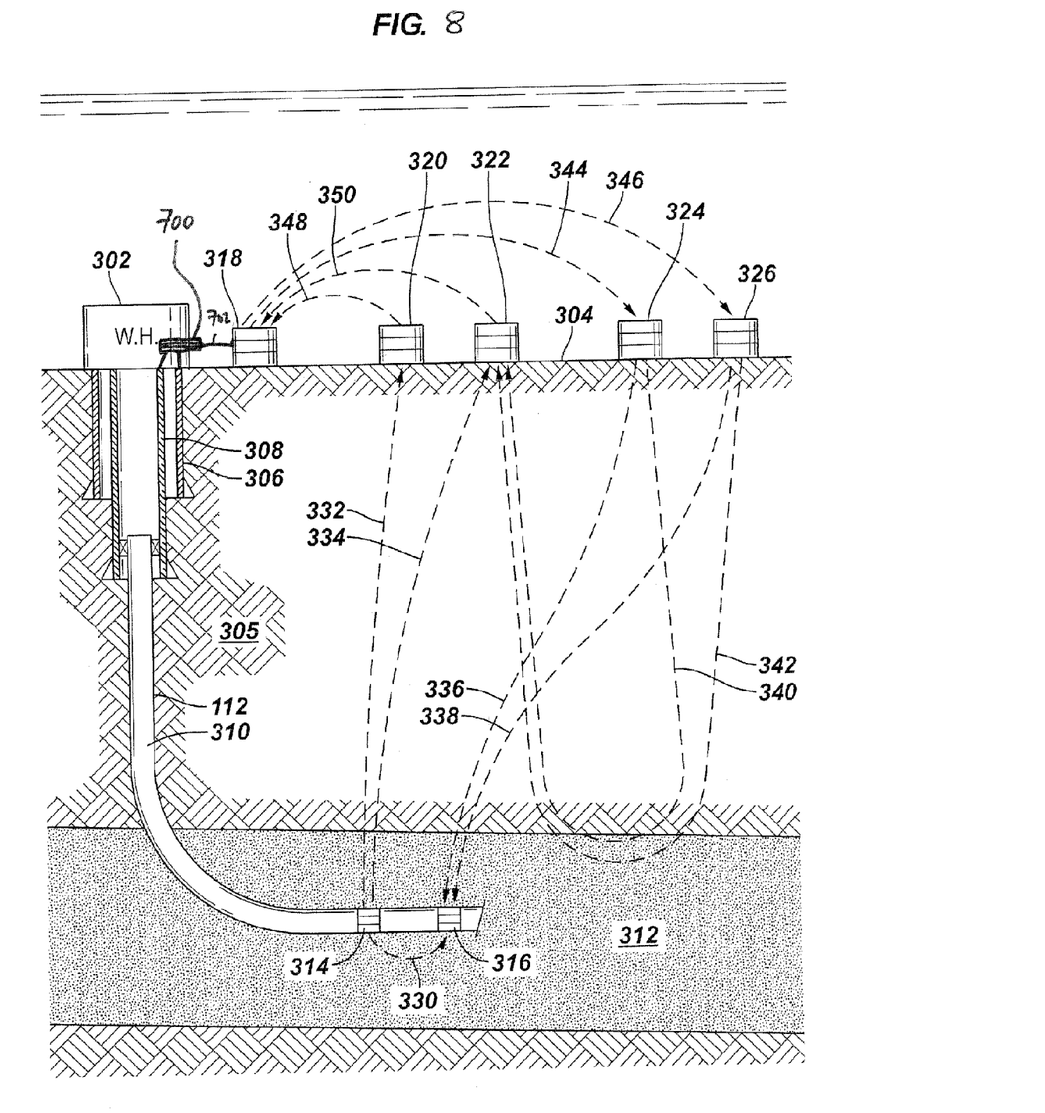
FIG. 8 illustrates wireless communication between or among subsea electrical devices and downhole electrical devices, according to another embodiment.

FIG. 8 illustrates another embodiment of a communications arrangement. The FIG. 8 arrangement is based on the FIG. 3 arrangement, and elements that are common between FIGS. 3 and 8 share the same reference numerals. The FIG. 8 arrangement differs from the FIG. 3 arrangement in that the electrical device 318 is electrically connected (at 702) to a connector 700 that is part of the wellhead 302. The connector 700 is electrically connected to casing sections 306, 308. This connection between the electrical device 318 through the connector 700 to casing sections 306 and 308 can improve communications between the seabed nodes (318, 320, 322, 324, and 326) and wellbore nodes (314, 316). Thus, for example, if one of the wellbore nodes 314, 316 transmits wireless signals, the wireless signals can be communicated through the formation 305 as well as along production string 310 in the wellbore 112 and through casing sections 306, 308 to the connector 700. In this manner, a receiver in the seabed node 318 can sense the wireless signals traveling through the production string 310 and casing sections 306, 308. Consequently, the total amplitude of signals received by the seabed node can be increased based on receiving wireless signals through the formation 305 as well as through the wellbore 112. Although seabed node 318 is the only node depicted as being connected to the connector 700, it is noted that any of the other seabed nodes 320, 322, 324, and 326 can also be electrically connected to the connector 700.

Instead of using the connector 700, a different type of connection can be as simple as touching an electrical conductor to the wellhead housing, where the electrical conductor is connected to any one of the seabed nodes 318-326.

Figure 9:
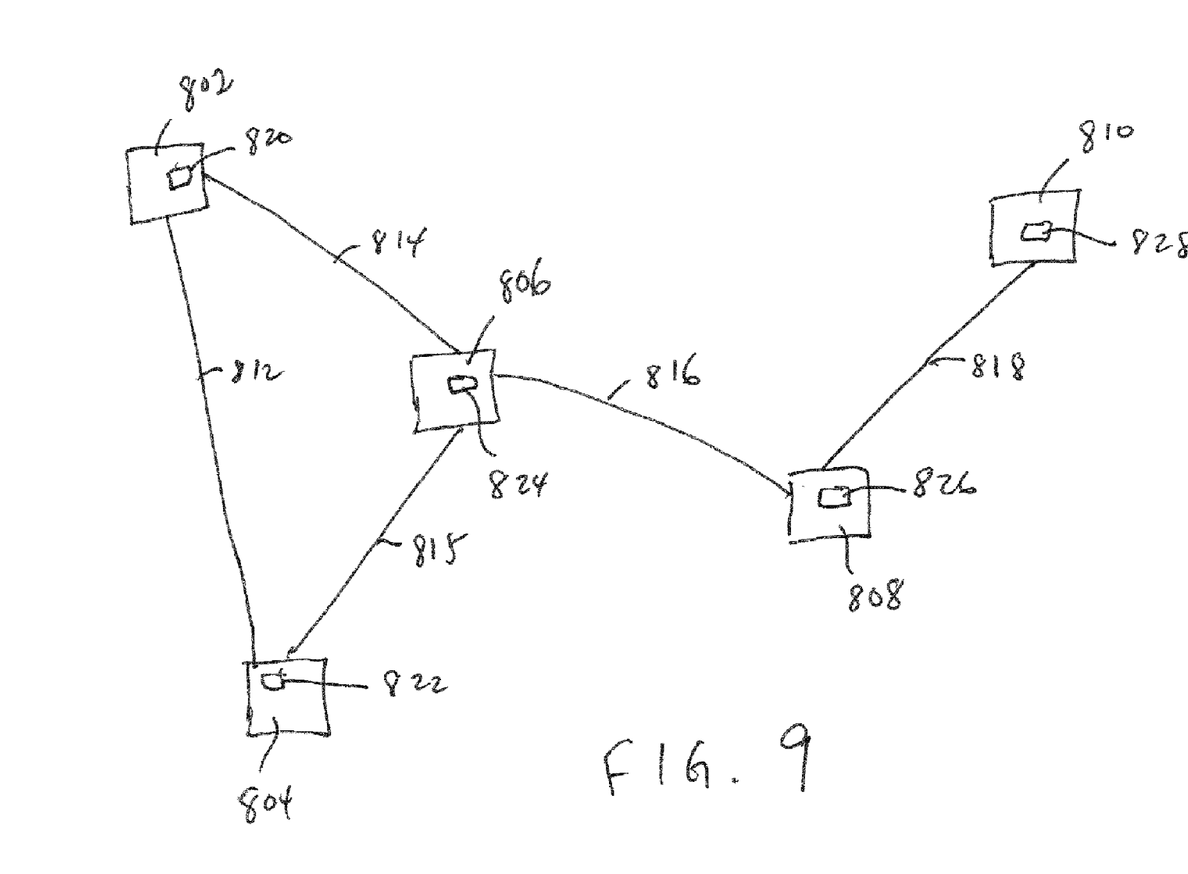
FIG. 9 is a plan view of an arrangement of network nodes and interconnecting wires that provide an enhanced antenna, according to an embodiment.

FIG. 9 shows a top view of an arrangement of seabed nodes 802, 804, 806, 808, and 810. Also depicted in FIG. 9 are the seabed nodes being electrically connected by cables 812, 814, 815, 816, and 818 (which can be electrical cables, fiber optic cables, etc.). These cables enable the seabed nodes to communicate among each other. Note that the use of cables in the embodiment of FIG. 9 differs from the wireless communications between seabed nodes depicted in FIG. 3.

A benefit of using wired communications between seabed nodes is that the cables that interconnect the seabed nodes can be used to form a larger antenna to better receive (or send) wireless signals (either wireless signals between the seabed nodes and the wellbore nodes, or between seabed nodes and a surface node). The antenna can be formed by providing wireless communications elements 820, 822, 824, 826, and 828 in respective seabed nodes 802-810. The wireless communications elements 820-828 generally are wireless transceivers, which can be, for example, seismic hydrophones (for acoustic communications) or large dipoles (for electromagnetic communications). The wireless communications elements 820-828 are electrically connected to respective cables 812, 814, 815, 816, and 818 to enable an array of wireless communications elements to be formed. The array of wireless communications elements provides improved wireless receiving and transmission capabilities based on improved signal-to-noise performance. The relatively large antenna provided by the combination of the cables 812-818 and wireless communications elements 820-828 can then be processed by any one of the particular nodes 802-810.

Even if cables 812-818 are omitted, the array arrangement depicted in FIG. 9 can provide another benefit. For electromagnetic signal communications, the electric field and/or magnetic field is measured at a receiver (part of wireless communications element 820, 822, 824, 826, 828). For wireless communications based on detecting electric field, a difference of potential is measured between two points (e.g., between wireless communications elements 820 and 824). The signal corresponding to this difference of potential can be improved in several ways: the difference of potential can be increased with increased distance between points, or the electric field between more than two points can be measured.

In the FIG. 9 arrangement, if the cables 812-818 are omitted, then the seabed nodes 802-810 can be considered to be five points. The electric field potential for electromagnetic communications can be measured among the five points represented by the seabed nodes 802-810. An average of the measurements, or any other filtering or processing technique such as beam forming, made by the seabed nodes can then be performed to better remove noise from the received electromagnetic signal. More generally, the seabed nodes can be considered to form n points, where n is greater than 2. A received electromagnetic signal is measured by the n points, where the response from each receiver is used as an input to filter noise. At each of the n points, a detected signal corresponding to the received electromagnetic signal is provided, with the detected signals from the n points combined (e.g., averaged or otherwise filtered) to produce an output signal having superior signal-to-noise characteristics.

Figure 10:
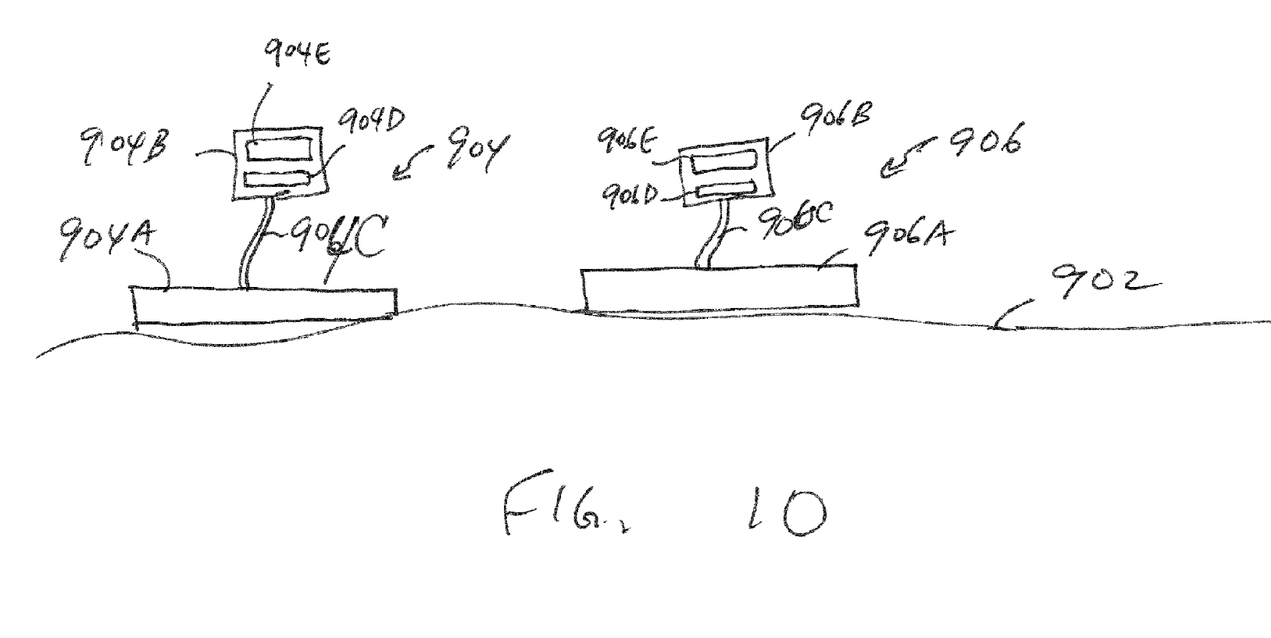
FIG. 10 illustrates network nodes each having an anchoring part and a floating part with electronics and sensing elements, according to an embodiment.

FIG. 10 illustrates seabed nodes 904 and 906 (positioned on a seabed 902), according to an embodiment. The seabed nodes 904 and 906 can be used to implement any of the seabed nodes depicted in FIGS. 3-9. The seabed node 904 has an anchoring part 904a and a floating part 904b, where the floating part 904b is releasably attached or linked to the anchoring part 904a by a link 904c. Similarly, the seabed node 906 has an anchoring part 906a and a floating part 906b that is attached to the anchoring part 906a by a link 906c.

The anchoring part 904a, 906a is formed of a dense material (e.g., concrete, steel, etc.) That sinks in sea water. Thus, the anchoring part 904a, 906a maintains the respective seabed node 904, 906 on the seabed 902. The floating part 904b includes a buoyant portion 904d and electronic circuitry 904e. Similarly, the floating part 906b includes a buoyant portion 906d and electronic circuitry 906e. The electronic circuitry 904e, 906e enables communications (wireless or wired) with other subsea nodes or with the surface node. The electronic circuitry 906e can also include sensing elements, such as sensing elements attached like arms from the floating part.

In response to a command sent to either subsea node 904 or 906 (and processed by electronic circuitry 904e or 906e), the floating part 904b or 906b can be detached from the anchoring part 904a, 906a and retrieved at the sea surface. Retrieval of the floating part 904e, 906e provides flexibility by allowing surface personnel to retrieve the parts for the purpose of retrieving information stored in memory, maintaining or repairing the electronic circuitry, or performing other tasks with respect to the floating part 904*b*, 906*b*.

While the invention has been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method for use in a subsea environment, comprising:
   wirelessly communicating between addressable nodes in a subsea wellbore and addressable nodes proximal a sea floor by transmitting wireless signals through a formation, each addressable node assigned a unique address; and
   arranging a plurality of the nodes proximal the sea floor in an array, the plurality of the nodes interconnected by cables to provide a larger antenna to enable enhanced wireless communications between the plurality of the nodes proximal the sea floor and one of a surface node and the nodes in the subsea wellbore.

2. The method of claim 1, wherein wirelessly communicating through the formation comprises wirelessly communicating electromagnetic signaling through the formation.

3. The method of claim 1, further comprising performing the wireless communicating during an exploration phase for determining characteristics of a reservoir in the formation.

4. The method of class 1, further comprising performing the wireless communicating during a drilling phase to provide feedback from the subsea wellbore.

5. The method of claim 1, further comprising performing the wireless communicating while completing a subsea wellbore.

6. The method of claim 1, further comprising wirelessly communicating between addressable nodes proximal the sea floor.

7. The method of claim 6, further comprising communicating between any of the addressable nodes and a sea surface node.

8. A method for use in a subsea environment, comprising:
   wirelessly communicating between addressable nodes in a subsea wellbore and addressable nodes proximal a sea floor through a formation, each addressable node assigned a unique address; and
   arranging a plurality of the nodes proximal the sea floor in an array, the plurality of the nodes interconnected by cables to provide a larger antenna to enable enhanced wireless communications between the plurality of the nodes proximal the sea floor and one of a surface node and the nodes in the subsea wellbore.

9. A method for use in a subsea environment, comprising:
   wirelessly communicating between addressable nodes in a subsea wellbore and addressable nodes proximal a sea floor through a formation, each addressable node assigned a unique address;
   receiving a wireless signal at N nodes proximal the sea floor, wherein N is greater than two;
   providing a detected signal corresponding to the received wireless signal from each of the N nodes; and
   combining the detected signals from the N nodes to produce an output signal representing the wireless signal.

10. The method of claim 1, further comprising:
    connecting at least one of the nodes proximal the sea floor to a subsea wellhead of the subsea wellbore; and
    communicating wirelessly through the subsea wellbore and subsea wellhead between the at least one of the nodes and a node in the subsea wellbore.

11. The method of claim 1, further comprising steering a drill string based on wireless communications between at least one node in the wellbore and at least one node proximal the sea floor.

12. A subsea well system comprising:
    a plurality of first nodes associated with respective addresses for positioning proximal a sea floor; and
    a second node associated with a second address for location in a subsea wellbore,
    wherein the first and second nodes are adapted to communicate wirelessly by transmitting wireless signals through a formation separating the first and second nodes, and
    wherein a plurality of the first nodes are electrically interconnected to provide a larger antenna to enable enhanced wireless communications between the plurality of first nodes and a device selected from among a surface node at a sea surface and the second node.

13. The subsea well system of claim 12, further comprising:
    a subsea wellhead for the subsea wellbore,
    wherein at least one of the first nodes is electrically connected to the subsea wellhead, the at least one first node to further wirelessly communicate with the second node through the subsea wellhead and the subsea wellbore.

14. The subsea well system of claim 12, wherein at least one of the first nodes comprises an anchoring part and a floating part releasably linked to the anchoring part, the floating part containing electronic circuitry to enable wireless communication by the first node.

15. The subsea well system of claim 14, wherein the at least one first node is responsive to a command to release the floating part from the anchoring part.

16. An apparatus comprising:
    an array of N subsea nodes, wherein N is greater than two, each subsea node including a wireless communications element; and
    cables to interconnect the array of N subsea nodes, the N wireless communications elements to cooperate to form an antenna.

17. The apparatus of claim 16, wherein the N wireless communications elements receive a wireless signal and produce N detected signals in response to the received wireless signal, and wherein at least one of the N subsea nodes combines the N detected signals to produce an output signal corresponding to the received wireless signal.

18. The apparatus of claim 16, wherein the wireless communications elements comprise wireless transceivers.

19. The apparatus of claim 16, wherein the wireless communications elements comprise at least one of hydrophones and dipoles.

* * * * *